(12) United States Patent
Chao et al.

(10) Patent No.: US 7,023,148 B2
(45) Date of Patent: Apr. 4, 2006

(54) POWER FEEDBACK POWER FACTOR CORRECTION HIGH FREQUENCY INVERTER

(75) Inventors: James Chien Fan Chao, Rancho Palos Verdes, CA (US); Kanghong Zhang, Torrance, CA (US); Yih-Fang Chiou, 1F, No. 132, Lane 39, Sec. 1, Shih-Pai Rd., Pei-TOU Dist., Taipei (TW)

(73) Assignee: Yih-Fang Chiou, Taipei (TW)

( * ) Notice: Subject to any disclaimer, the term of this patent is extended or adjusted under 35 U.S.C. 154(b) by 93 days.

(21) Appl. No.: 10/748,877

(22) Filed: Dec. 29, 2003

(65) Prior Publication Data

US 2005/0146906 A1 Jul. 7, 2005

(51) Int. Cl.
*G05F 1/00* (2006.01)
*H05B 37/02* (2006.01)

(52) U.S. Cl. ............... 315/307; 315/299; 315/276

(58) Field of Classification Search .......... 363/37, 363/49, 56.1, 95, 98, 143; 315/244, 276, 315/239, 226, 224, 307, 247, 299
See application file for complete search history.

(56) References Cited

U.S. PATENT DOCUMENTS 6,100,648 A * 8/2000 Moisin .............. 315/224

* cited by examiner

*Primary Examiner*—Rajnikant B. Patel

(57) ABSTRACT

An electronic high frequency supply, such as lamp ballast, includes a double rectifier, two storage Capacitors in series, and an isolating inductor between rectifier and an AC input. Each storage capacitor is charged to a voltage greater than peak of the AC input. An inverter is connected to the storage capacitors, and has a high frequency inductive load circuit connected between inverter output and a junction between the isolating inductor and double rectifier. A capacitor, connected from the junction to the junction of two storage capacitors, forms a high frequency resonance circuit with the inductive load circuit. Current is drawn from the input AC only as a series of pulses at the inverter frequency. The isolating inductor filters out the high frequency part of the current pulse and makes the input current near sine wave.

3 Claims, 4 Drawing Sheets

POWER FEEDBACK POWER FACTOR CORRECTION HIGH FREQUENCY INVERTER

BACKGROUND OF THE INVENTION

1. Field of the Invention

The present invention relates to power feedback power factor correction high frequency inverters, and more particularly to the power feedback power factor correction high frequency inverter used for a lamp ballast.

2. The Prior Arts

Electronic lamp ballasts currently available on market have a circuit as shown in FIG. 1, which comprises an AC (alternate current) filter circuit 10, a bridge rectifier circuit 11, a DC (direct current) rectifier circuit 12 and a DC/AC conversion circuit 13. The electronic lamp ballast drives a lamp tube 14 to start irradiating. However, the DC rectifier circuit 12 of the known electronic ballast uses only a single capacitor 20 to form the filter circuit. Although it has the advantages of low cost, simple circuit, and high load variation resistance, yet this type of filter circuit has a shorter period of charging current which occurs only when the voltage at the power source side is higher than the voltage drop across the capacitor at its DC output side. Therefore, the known circuit produces a large ripple current and, consequently, leads to low efficiency. As such, the power factor of the known ballast is merely between 0.5 and 0.6 as shown in FIG. 2, which shows, for the known device, the input ripple current is large and the power factor is low. This phenomenon apparently leads to the result of increasing power consumption and the waste of power.

Due to the shortcomings and restrictions imposed on the conventional electronic lamp ballast, it is desired to provide a ballast having a power feedback power factor correction high frequency inverter to overcome the shortcomings and restrictions.

SUMMARY OF THE INVENTION

Therefore, an object of the present invention is to provide a power feedback power factor correction high frequency inverter for lamp ballast.

To realize the above object, in accordance with the present invention, an electronic high frequency supply, such as a lamp ballast, having a double rectifier, two storage capacitors in series, and an isolating inductor between the rectifier and an AC input is provided. Each storage capacitor is charged to a voltage greater than the peak of the AC input. An inverter is connected to the storage capacitors, and has a high frequency inductive load circuit connected between an inverter output and a junction between the isolating inductor and the double rectifier. A capacitor, connected from the junction to the junction of two storage capacitors, forms a high frequency resonance circuit with the inductive load circuit. Current is drawn from the input AC only as a series of pulses at the inverter frequency. The isolating inductor filters out the high frequency part of the current pulse and makes the input current near sine wave.

For more detailed information regarding advantages or features of the present invention, at least an example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
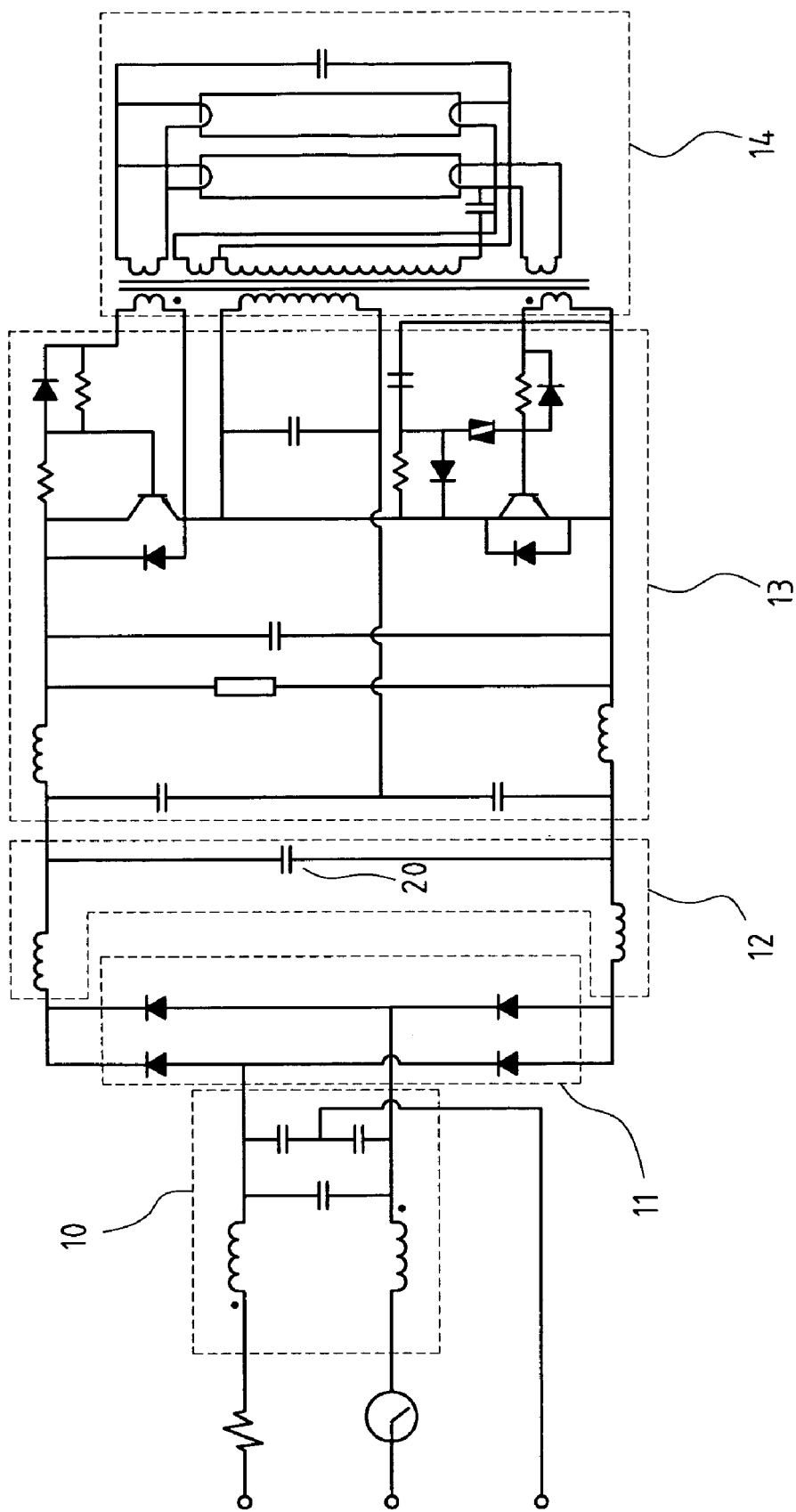
FIG. 1 is a circuit diagram of a conventional electronic ballast.
Figure 2:
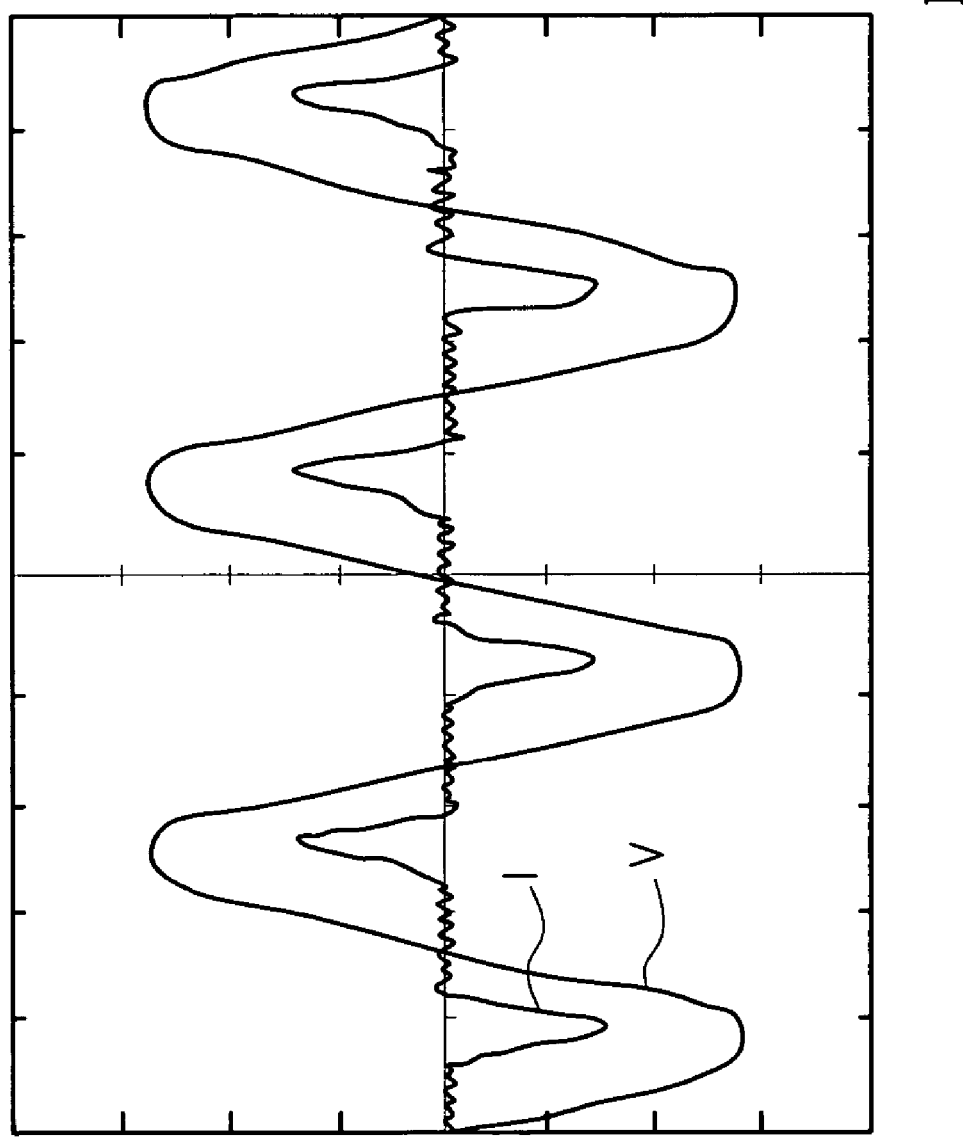
FIG. 2 is a waveform diagram of voltage vs. current of an AC input side of the conventional electronic ballast shown in FIG. 1.
Figure 3:
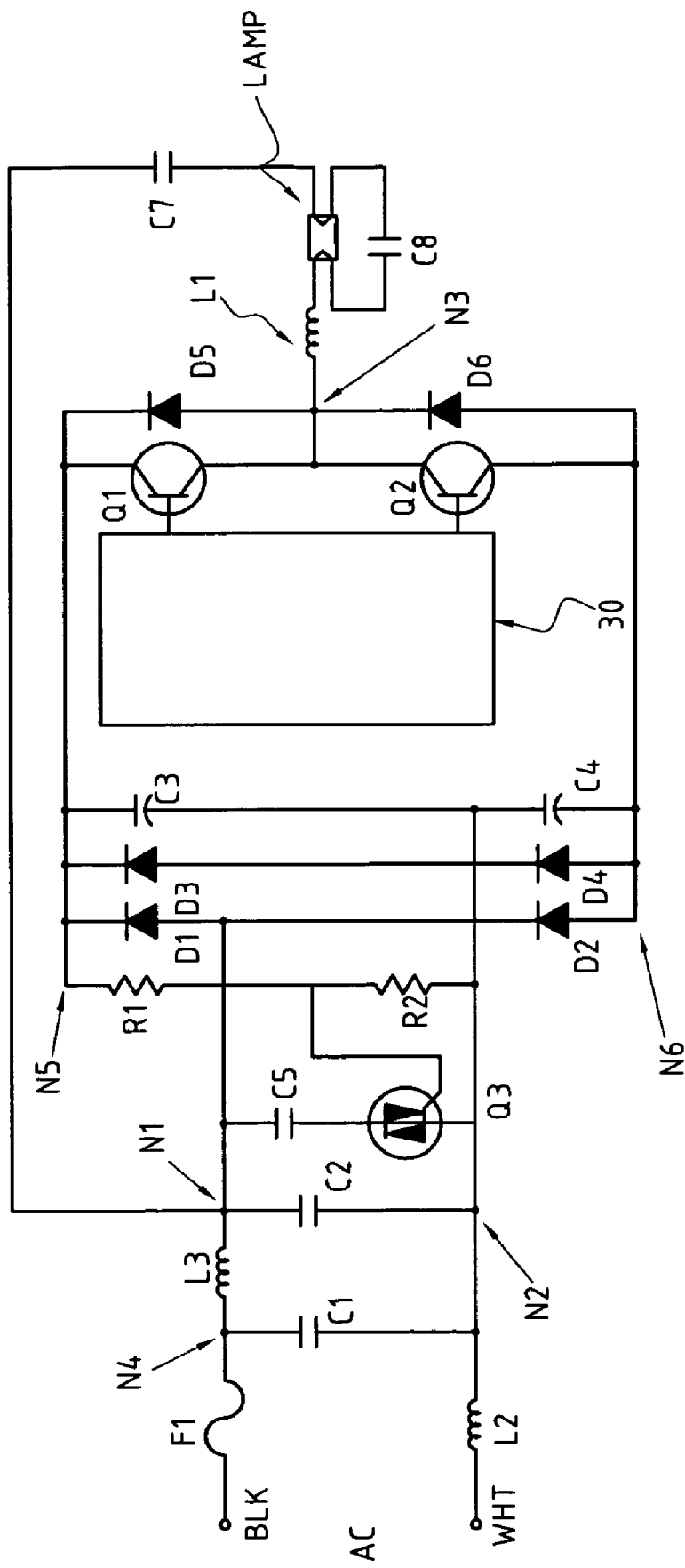
FIG. 3 is a circuit diagram of a power feedback power factor correction electronic ballast according to the present invention.

With reference to the drawings and in particular to FIG. 3, a fluorescent lamp LAMP is energized by a high frequency half-bridge inverter formed by two transistors Q1 and Q2. A choke L1 is connected in series with the lamp. A tuning capacitor C8 is connected in parallel with the lamp. A coupling capacitor C7 is connected from the lamp to the junction N1.

The source of power for the ballast is an input AC, typically from a 120V, 60 Hz mains (line). The input line is connected to a double rectifier D1-D2-C3-C4 through a fuse F1, an interference filter formed by line choke L2 and a capacitor C1, and the power factor correction circuit formed by isolating inductor L3 and tuning capacitor C2. The negative output of double rectifier is connected to circuit ground, and the positive output is the high voltage supply for the inverter.

The inductor L3, the tuning capacitor C2, the diodes D1 and D2, and the coupling from the tuned high frequency circuit, act together to provide energy transfer from the input line to the storage capacitor C3 and C4 at high frequency rate, and produce an elevated DC input to the inverter as will be explained below. Tuning capacitor C2 is connected between junctions N1 and N2.

The inverter is controlled by a driver circuit 30.

An over voltage protection circuit is formed by C5, Q3, R1 and R2. R1 and R2, which are connected in series to form a voltage sensing circuit to sense the voltage across one of the storage capacitors, as C3 on FIG. 3. The output of the voltage sensing circuit triggers the TRIAC Q3 that puts the shunt capacitor C5 in when the voltage sensing circuit senses a high voltage.

The over voltage protection circuit can sense the voltage drop across C3 or C4 of one of the storage capacitors, or the total direct current voltage. Namely, the sum of voltage drops across C3 and C4, or any electric quantity related to the DC voltage in the circuit.

The basic circuit of FIG. 3 is operable as described below, from different AC line voltage or frequencies, with different lamp loads, with single or multiple loads, and at different inverter topologies or frequencies, by adjusting the component values as will be clear to those of ordinary skill in the electronic ballast art.

The inverter formed by transistors Q1 and Q2 is normally operated at frequency from 20 KHz to 150 KHz with a 50% duty cycle for each transistor. The high frequency current through the inductor L1 causes the voltage across C2 to rise and fall, once each cycle of lamp current, between limits shown in FIG. 4.

Circuit behavior follows the cyclical pattern now to be described. The circuit is symmetric when line input is at positive side and at negative side. The following discussion assumes the line input is at positive side, which has relation with D1, C3 and voltage from node. When the line input is at negative side, we can replace D1 and C3 with D2 and C4 in the following discussion.

During a first stage of each high frequency cycle, immediately after transistor Q1 is switched on, because of the substantial inductance of inductor L1, current is still flowing in a direction from node N1 to node N3. The transistor Q2 is switched off, and current during this stage will flow in the "backwards" direction, through freewheel diode D5 in a direction to charge C3, and through input power line (or filter) and coupling capacitor C7. The absolute value of the inductor current now falls rapidly. Voltage Vc2 across C2 drops until it goes to second stage. If this voltage drops below the voltage Vc4 across C4, it will be limited by D2 to voltage C4. The voltage drop is determined by power line input voltage, L1 current, L3, C1, L1, C8 and effective lamp resistance. Vc2-min, the envelop of the lowest level of the voltage drop is shown on FIG. 4. It is a half cycle of a sine wave with amplitude from −Vc4 to a certain voltage below the peak power line input voltage. This certain voltage is determined by the voltage drop on L3 at peak power line input.

A certain period of time after transistor Q1 has been turned on, current through the inductor L1 reverses as the circuit enters the second stage of the high frequency cycle. The voltage at node N1, (which touches the Vc2-min at this time) then starts to rise as capacitor C2 is charged. Capacitor C3 is now discharging through transistor Q1, and inductor L1 current rises at a rate determined by the voltage across C7, the instantaneous difference in voltage (Vc3−Vc2) between the capacitor C2 and C3, the inductance L1 and the effective resistance of the lamp. After the node N1 voltage reaches the sum of the voltage Vc3 across the storage capacitor C3 plus the diode drop of D1, the circuit enters in third stage. The node N1 voltage remains constant, and no current flows through capacitor C3. Driven solely by the voltage across coupling capacitor C7, the still rising inductor current follows through diode D1.

In a fourth stage, immediately after the inverter switches, Q2 being on and Q1 off, the voltage driving the tank circuit is reversed. Current is still flowing through diode D1, and will flow through capacitor C3 in a charging direction, but at a rapidly falling rate. When the lamp current reverses, the current enters the fifth stage. Diode D1 will cut off, and the voltage across C2 will start falling toward the voltage Vc2-min. The reverse current will increase with a waveform similar to the previous positive current increase. No current flows through capacitor C3.

When Vc2 reaches Vc2-min, the sixth stage is reached. The inductor current then flows through transistor Q2, storage capacitor C4 and the line or line filter, and through isolating inductor L3 and coupling capacitor C7. Immediately after the inverter again switches, and Q2 is turned off, this current will start to fall sharply as it flows through D5, in a charging direction through C3, through input power line (or filter) and coupling capacitor C7, thus repeating stage as described above.

The six different stages of one high frequency cycle are only partly symmetrical. The storage capacitor C3 receives charging current during the first stage, and storage capacitor C4 may receive charging current during the fourth stage depending on the voltage drop immediately following each switching of die inverter. C3 discharges during stage 2 when die voltage across C2 is being raised from Vc2-min to the value where diode D1 conducts. And C4 may charge during stage 6 when the voltage on C2 falls below −Vc4, which normally occurs when the power line voltage varies across 0.

Figure 4:
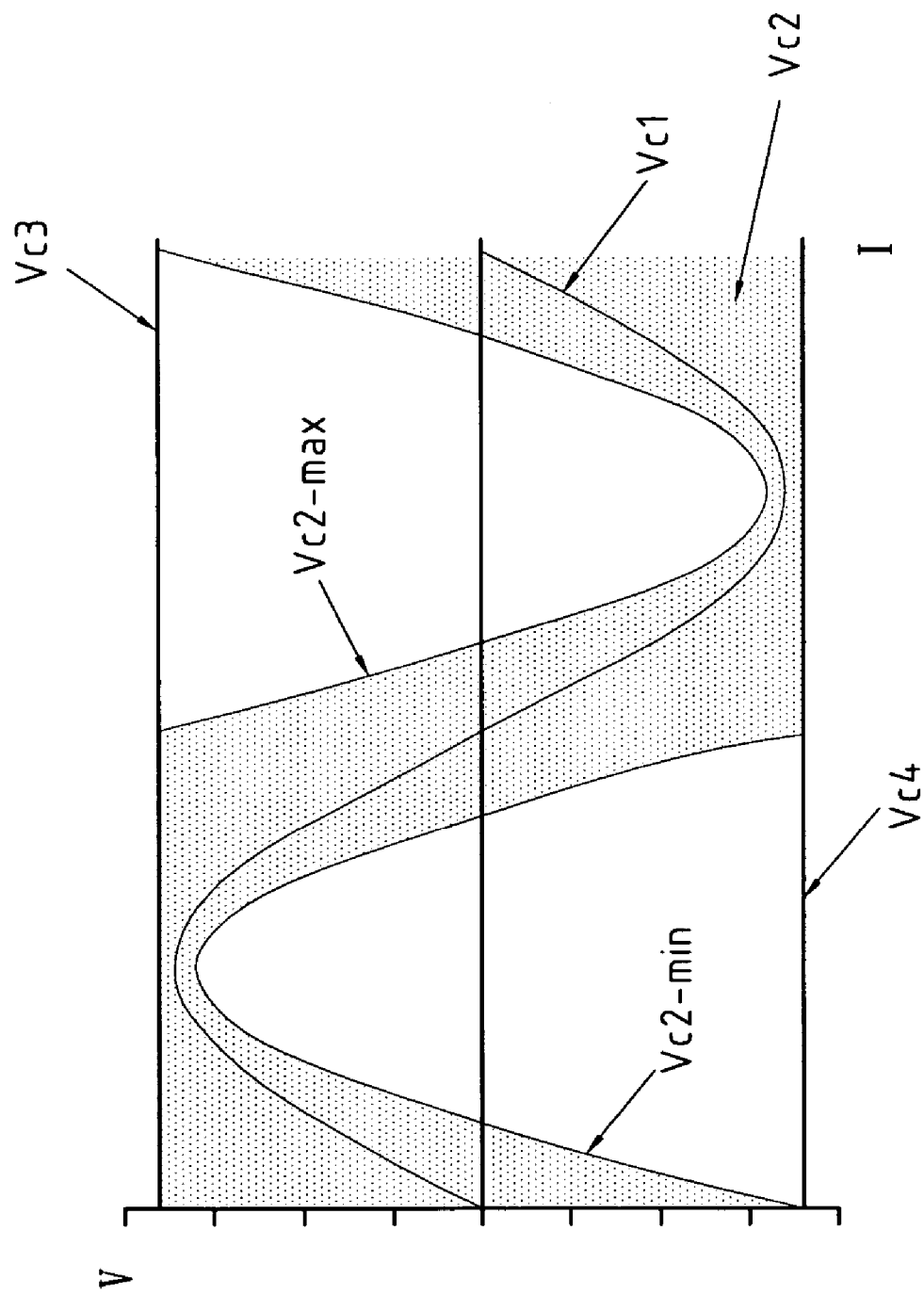
FIG. 4 is a waveform diagram of voltage vs. current of an AC input side of the electronic ballast of the present invention.

When the power line goes to negative side, the reversed voltage drop envelope is Vc2-max shown on FIG. 4. Every stage is symmetrical as the power line is in positive side described above.

The average voltage across C2 reflects the average current through L1. When the component values and inverter frequency have been properly selected, the average current through L3 matches the power line input voltage waveform. Except for the high frequency pulsation, which is filtered by the interference filter, to the power line input, the ballast load looks like a pure resistance. Analysis shows that this requires that the value of storage capacitor C3 and C4 be sufficiently high so that Vc3 and Vc4 do not change appreciably over the course of a line voltage cycle, and requires that the voltage across C3 and C4 exceed the peak voltage of line input.

The above description and explanation of the Embodiment of the present invention are illustrative only, and it is not intended to limit the contents or the scope of the claim and the present invention. And all the equivalent variations and modifications can be made hereto without departing from the spirit and the scope of the present invention, and should be considered fall within the scope of the attached claims.

What is claimed is:

1. An electronic power supply for a high frequency load, comprising:
   a power input section receiving input power at a low AC frequency from a power line input, said power input section comprising a double rectifier with two storage elements, and an isolating element having a first end connected to said double rectifier and a second end connected to said power line input;
   a high frequency section receiving power from said power input section and providing high frequency current to said high frequency load, said high frequency section having two switching devices connected to an output node and each switching device being connected in parallel with a diode; and
   an output and feedback circuit including an inductor and a capacitor, said inductor having a first end connected to said output node and a second end connected to a first end of said high frequency load, and said capacitor having a first end connected to a second end of said high frequency load and a second end connected to said first end of said isolating element.

2. The electronic power supply for a high frequency load as claimed in claim 1, wherein said power input section further comprises a voltage protection circuit.

3. The electronic power supply for a high frequency load as claimed in claim 2, wherein said voltage protection circuit includes a voltage sensing circuit for sensing a voltage value across one or hot of said two storage elements and a triac device connected to said voltage sensing circuit.

* * * * *